(12) United States Patent
Mueller et al.

(10) Patent No.: US 12,084,243 B2
(45) Date of Patent: Sep. 10, 2024

(54) PACKAGING WITH PAPER MATERIAL

(71) Applicants: MULTIVAC SEPP HAGGENMUELLER SE & CO. KG, Wolfertschwenden (DE); KOEHLER INNOVATION & TECHNOLOGY GMBH, Oberkirch (DE)

(72) Inventors: Jens Mueller, Ravensburg (DE); Reinhard Ruhland, Bad Groenebach (DE); Marius Schulte, Oberkirch (DE); Claus Jurisch, Offenburg (DE); Christian Kind, Baden-Baden (DE); Dominik Hoferer, Lautenbach (DE); Aljoscha Foell, Appenweier (DE)

(73) Assignees: MULTIVAC Sepp Haggenmueller SE & Co. KG, Wolfertschwenden (DE); Koehler Innovation & Technology GmbH, Oberkirch (DE)

( * ) Notice: Subject to any disclaimer, the term of this patent is extended or adjusted under 35 U.S.C. 154(b) by 28 days.

(21) Appl. No.: 18/024,726

(22) PCT Filed: Sep. 6, 2021

(86) PCT No.: PCT/EP2021/074507
§ 371 (c)(1),
(2) Date: Mar. 3, 2023

(87) PCT Pub. No.: WO2022/049289
PCT Pub. Date: Mar. 10, 2022

(65) Prior Publication Data
US 2023/0312202 A1    Oct. 5, 2023

(30) Foreign Application Priority Data
Sep. 4, 2020 (DE) .......................... 102020123123.7

(51) Int. Cl.
*B65D 65/42* (2006.01)
*B32B 1/00* (2006.01)
(Continued)

(52) U.S. Cl.
CPC ................ *B65D 65/42* (2013.01); *B32B 1/00* (2013.01); *B32B 27/10* (2013.01); *B32B 27/40* (2013.01);
(Continued)

(58) Field of Classification Search
CPC .... B65D 65/42; B65D 75/26; B65D 77/2024; B65D 2565/387; B65D 2577/2025;
(Continued)

(56) References Cited

U.S. PATENT DOCUMENTS 5,873,931 A * 2/1999 Scholz ..................... C09D 5/00
516/914
11,578,200 B2 2/2023 Kuhl et al.
(Continued)

FOREIGN PATENT DOCUMENTS

CN 111511542 A 8/2020
CN 111511987 A 8/2020
(Continued)

OTHER PUBLICATIONS

PCT Search Report (with English Translation), Dated Sep. 4, 2020, Application No. PCT/EP2021/074507, Applicant Multivac SEPP Haggenmueller SE & Co. KG, 5 Pages.
(Continued)

*Primary Examiner* — Jacob K Ackun
(74) *Attorney, Agent, or Firm* — Brooks Kushman P.C.

(57) ABSTRACT

A packaging unit comprises at least one first piece of packaging material, wherein the first piece of packaging material has a coated paper, which has a base paper and at least three coatings applied one on top of the other on the
(Continued)

base paper. The at least three coatings have in a sequence in which they are given, starting from the base paper, a first barrier layer, comprising at least one hydrophobic polymer, a second barrier layer, comprising at least one hydrophilic polymer, and a third barrier layer, comprising at least one hydrophobic polymer. Furthermore, the packaging is closed in a gas-tight manner.

20 Claims, 1 Drawing Sheet

(51) Int. Cl.
  *B32B 27/10* (2006.01)
  *B32B 27/40* (2006.01)
  *B32B 29/00* (2006.01)
  *B65D 75/26* (2006.01)
  *B65D 77/20* (2006.01)
(52) U.S. Cl.
  CPC ............ *B32B 29/005* (2013.01); *B65D 75/26* (2013.01); *B65D 77/2024* (2013.01); *B32B 2255/12* (2013.01); *B32B 2255/26* (2013.01); *B32B 2255/28* (2013.01); *B32B 2307/4026* (2013.01); *B32B 2307/718* (2013.01); *B32B 2307/7265* (2013.01); *B32B 2307/73* (2013.01); *B32B 2439/40* (2013.01); *B65D 2565/387* (2013.01); *B65D 2577/2025* (2013.01)
(58) Field of Classification Search
  CPC ........... B32B 1/00; B32B 27/20; B32B 27/40; B32B 29/005; B32B 2255/12; B32B 2255/26
  USPC ....................................... 206/524.2
  See application file for complete search history.

(56) References Cited

U.S. PATENT DOCUMENTS

| | | | |
|---|---|---|---|
| 2007/0286928 A1* | 12/2007 | Sarmas | ............... B65D 81/266 426/106 |
| 2011/0248076 A1 | 10/2011 | Bentmar et al. | |
| 2017/0259546 A1 | 9/2017 | Knauf | |
| 2021/0108017 A1* | 4/2021 | Krayer | ............... C09D 151/003 |

FOREIGN PATENT DOCUMENTS

| | | |
|---|---|---|
| DE | 10 2010 021 027 A1 | 11/2011 |
| DE | 10 2016 201 498 A1 | 8/2017 |
| DE | 10 2019 129 712 A1 | 5/2021 |
| EP | 2 586 606 A1 | 5/2013 |
| EP | 3 278 972 A1 | 2/2018 |
| JP | H08230115 A | 9/1996 |
| JP | 2002068283 A | 3/2002 |
| JP | 20020121506 A | 8/2020 |
| WO | 2018/109448 A1 | 6/2018 |
| WO | 2019/199491 A1 | 10/2019 |

OTHER PUBLICATIONS

German Search Report Dated May 12, 2021, Application No. 10 2020 123 123.7, Applicant Koehler Innovation & Technology GmbH u.a., 6 Pages.
Japanese Office Action, JP Application No. 2023-514923, dated Apr. 16, 2024 (with English machine translation) (14 pages).
Office Action and Search Report re Chinese Patent Application No. 202180054326.0, Applicant: MULTIVAC Sepp Haggenmueller SE & Co. KG and Kohler Innovative Technologies GmbH, dated Jul. 1, 2024 (with English machine translation) (14 pages).

* cited by examiner

PACKAGING WITH PAPER MATERIAL

This application is the U.S. national phase of PCT Application No. PCT/EP2021/074507 filed on Sep. 6, 2021, which claims priority to German Patent Application No. DE 10 2020 123 123.7 filed on Sep. 4, 2020, the disclosures of which are incorporated in their entireties by reference herein.

TECHNICAL FIELD

The invention relates to a packaging for a product using a coated paper material.

Packaging in general refers to the cover or (partial or complete) wrapping of an object or product, in particular for its protection or for better handling. Consequently, a packaging material comprises the material forming such packaging or part of the packaging.

Packaging materials can, for example, be based on paper, plastics and/or metals. The present invention is concerned with packaging materials based on paper.

BACKGROUND

In principle, the use of paper-based packaging materials is well known. Up to now, however, there is not known any fiber/paper-based flexible packaging material which would be suitable for packaging oxidation-sensitive, moist and fatty objects, in particular foodstuffs, and at the same time is free from halogen-containing compounds or barrier layers of aluminum, $Al_2O_3$ and/or $SiO_2$, which have to be applied outside a paper coating machine by means of lamination or vapor deposition.

Conventional packaging materials often contain compounds such as polyvinylidene chloride (PVDC; halogen-containing), lack tear strength, which can contribute to running problems on packaging equipment, and are also not recyclable due to too high a coating content via the paper stream. Furthermore, conventional packaging materials are too permeable to water, water vapor, oxygen and grease, resulting in a low shelf life of the packaged product.

WO 2018/109448 A1 discloses a method for manufacturing a package in which a fibrous material (such as paper) is provided with a gas barrier film (optionally comprising several layers).

SUMMARY

It is the object of the present invention to provide an improved packaging which is particularly suitable for the packaging of perishable foodstuffs.

This problem is solved by a packaging, according to the disclosure, which is gas-tight and has, at least in sections, a coated paper comprising a base paper and at least three coatings applied one on top of the other thereon, wherein the at least three coatings have in the sequence in which they are given, starting from the base paper, a first barrier layer, comprising at least one hydrophobic polymer, a second barrier layer, comprising at least one hydrophilic polymer, and a third barrier layer, comprising at least one hydrophobic polymer.

A paper coated in this way is characterized in particular by the fact that it is particularly suitable as a packaging material for oxidation-sensitive, moist and greasy objects, especially foodstuffs, and can even be used to produce packaging by means of ultrasonic or heat-sealing application if required. Furthermore, adhesion promoters between the individual layers can be dispensed with without disadvantages and barrier layers based on halogen-containing compounds, aluminum, $Al_2O_3$ and/or $SiO_2$ need not be present.

Such a coated paper can also be produced relatively easily and with low coating weights.

In the following, the term "comprise" shall also cover "consisting of".

"Hydrophobic" refers to substances that cannot be mixed with water. "Hydrophilic" refers to substances that can be mixed with water. Hydrophobic polymers are also called non-polar polymers and hydrophilic polymers are also called polar polymers.

Hydrophobicity or hydrophilicity can be defined, for example, by the log P value. The n-octanol/water partition coefficient $K_{ow}$ (spellings such as octanol/water partition coefficient are also common and correct) is a dimensionless partition coefficient known to the skilled person which indicates the ratio of the concentrations of a chemical in a two-phase system of n-octanol and water and is thus a measure of the hydrophobicity or hydrophilicity of a substance. The log P value is the decadic logarithm of the n-octanol-water partition coefficient $K_{ow}$. The following applies:

$$K_{ow} = P = \frac{c_0^{Si}}{c_w^{Si}} \; und \; \log P = \log \frac{c_0^{Si}}{c_w^{Si}} = \log c_o Si - c_w Si$$

where $c_o^{Si}$=concentration of a chemical in the octanol-rich phase and $c_w^{Si}$=concentration of a chemical in the water-rich phase.

$K_{ow}$ is greater than one if a substance is more soluble in fat-like solvents such as n-octanol, less than one if it is more soluble in water. Accordingly, log P is positive for hydrophobic/lipophilic and negative for hydrophilic/lipophobic substances.

Preferred embodiments of the coated paper are described below:

Coated paper, wherein the first barrier layer contains or consists of substances selected from the group consisting of lipophilic substances, kerosenes, in particular hard kerosenes, waxes, in particular microcrystalline waxes, waxes based on vegetable oils or fats, waxes based on animal oils or fats, vegetable waxes, animal waxes, low molecular weight polyolefins, polyterpenes and mixtures thereof.

Coated paper, wherein the second barrier layer reduces or prevents the transfer of substances, in particular hydrophobic substances.

Coated paper, wherein the transfer of substances, in particular hydrophobic substances, from or through the first barrier layer, into or beyond the third barrier layer is reduced or prevented.

Coated paper, wherein the transfer of substances, in particular hydrophobic substances, from the third barrier layer or through the third barrier layer, into the first barrier layer is prevented.

Coated paper, wherein the transfer of substances selected from the group consisting of lipophilic substances, kerosenes, in particular hard kerosenes, waxes, in particular microcrystalline waxes, waxes based on vegetable oils or fats, waxes based on animal oils or fats, vegetable waxes, animal waxes, low molecular weight polyolefins, polyterpenes and mixtures thereof is reduced or prevented.

The transfer of these substances can be reduced or prevented, in particular, by suitable type and amount of the at least one hydrophilic polymer of the second barrier layer.

Coated paper, the third barrier layer being free, apart from unavoidable or permissible impurities, from substances which are not permitted for direct food contact, in particular substances selected from the group consisting of lipophilic substances, kerosenes, in particular hard kerosenes, waxes, in particular microcrystalline waxes, waxes based on vegetable oils or fats, waxes based on animal oils or fats, vegetable waxes, animal waxes, low molecular weight polyolefins, polyterpenes and mixtures thereof.

Hard kerosenes, in particular of natural origin or synthetic, microcrystalline waxes, low molecular weight polypropylene, natural waxes, low molecular weight polyolefins, polyterpenes and their mixtures are in particular those defined in BfR XXV. dated Jun. 1, 2019 (Federal Institute for Risk Assessment of the Federal Ministry of Food and Agriculture Germany) or in the respective versions.

This prevents a) these substances from passing into the third barrier layer and/or from passing out of the third barrier layer, in particular into a contact material, in particular in contact with fatty foodstuffs, and b) the barrier properties of the layers, in particular those of the first, second and/or third barrier layer, from being maintained or otherwise altered or completely lost by a transfer of these substances by reducing or preventing the transfer of these substances, c) substances from the contact material being transferred into the first barrier layer and/or altering the first barrier layer as a result.

The base paper used in the coated paper is principally not limited. The term "base paper" includes any paper material, including cardboard or paperboard.

It is preferred that the base paper has a basis weight of 20 to 120 $g/m^2$, preferably 40 to 100 $g/m^2$.

It is further preferred that the paper has a composition with a long fiber content of from 10 to 80%, preferably from 20 to 50%, and a short fiber content of from 20 to 90% by weight, preferably from 50 to 80% by weight.

Long fiber means a fiber with a fiber length of 2.6 to 4.4 mm and short fiber means a fiber with a fiber length of 0.7 to 2.2 mm.

In addition, 0 to 20%, preferably 0 to 5%, of fillers, such as GCC, known for example under the trade name Hydrocarb 60 or Hydroplex 60, PCC, known for example under the trade name PreCarb 105, natural kaolin and/or talc, as well as usual auxiliaries, such as retention agents and/or sizing agents, may be present.

The advantage of such a base paper is, on the one hand, its high flexibility and, on the other hand, its good processability on existing packaging equipment, the maintenance of high machine availability and the achievement of the necessary puncture resistance.

Thanks to the barrier effect of the coated paper to the passage of oxygen, the packaging according to the invention offers particular advantages with regard to the packaging of products that are either particularly sensitive to oxidation or are specifically packaged under an atmosphere with a particularly high oxygen content in order to extend their shelf life. Common to both cases is that the packaging can maintain a high gradient in oxygen concentration relative to the environment of the packaging over a comparatively long period of time. For this reason, the packaging is particularly suitable when an oxygen content in the packaging interior space atmosphere is either very low, for example, below 3% or even at most 2%, or, conversely, when the oxygen content in the packaging interior space atmosphere is very high—for example, above 60% or even 70% and more. Both ranges are very different from the oxygen content in common ambient air, which is typically about 20.95%.

To support the barrier effect for the passage of gases, the packaging is preferably closed in a gas-tight manner by means of at least one seal seam. Packaging materials are fused to each other at this seal seam.

A first variation is that the packaging comprises only the first piece of packaging material and the first piece of packaging material is sealed to itself, for example after the piece of packaging material has been folded back onto itself. These packaging, which can be produced, for example, on a tubular bag packaging machine or a chamber type vacuum packaging machine (including so-called chamber belt machines), are particularly easy to produce because they require especially few seal seams.

In a second embodiment, the packaging comprises a second piece of packaging material in addition to the first piece of packaging material, wherein the two pieces of packaging material are being sealed to each other. The second piece of packaging material can thereby either comprise a plastic material, in particular a thermoformable plastic material (such as polyurethane, PU). Alternatively, the second piece of packaging material has the same coated paper as the first piece of packaging material.

The packaging of the variant with a first and a second piece of packaging material may be produced, for example, on a tray sealing machine (tray sealer) or on a thermoforming packaging machine. In this regard, the first piece of packaging material with the coated paper can be used either as the tray or as a lid to close a tray.

Preferably, in the first piece of packaging material or in the second piece of packaging material (if present), the side of the base paper provided with the coatings faces the interior of the packaging. Alternatively, however, it is also conceivable that the side of the base paper on which the coatings are applied faces away from the interior of the packaging.

The first barrier layer comprises at least one hydrophobic polymer. This barrier layer preferably serves as a barrier layer for water vapor and thus protects the packaged product from drying out. It also serves to protect the hydrophilic barrier from moisture, as this can only develop its full effect in a dry state.

The at least one hydrophobic polymer preferably comprises a polymer based on a polyacrylate and/or a polyolefin. Suitable polymers are in particular polymethyl acrylates, polymethyl methacrylates, polyethyl arylates, polyethyl methacrylates, poly(n-, iso-, tert.-)butyl acrylates, poly(n-, iso-, tert)butyl methacrylates, polycyclohexyl methacrylates, polyethylhexyl acrylates and copolymers thereof, graft polymers, and copolymers with styrene, acrylonitrile, methylstyrene or vinyl toluene, styrene-butadiene copolymers), polyvinyl acetates (also partially saponified), polyesters, polyamides, polyurethanes, polyethers, polyethylene imines, and/or polyvinylamides.

In addition to the hydrophobic polymer, a wax may also be present. Suitable waxes include compounds such as kerosenes or natural mixtures or pure substances of short- to medium-chain hydrocarbon compounds, colloquially known as "waxes." Suitable waxes are, for example, heneicosane, docosane, tricosane, tetracosane, pentacosane, hexacosane, heptacosane, octacosane, nonacosane, triacontane, hentriacontane, dotriacontane, tritriacontane, tetratriacontane, pentatriacontane, hexatriacontane, heptatriaontane, octatriacontane, nonatriacontane; Montan waxes, natural waxes (carnauba wax, beeswax, candelilla wax), waxes produced by hydrogenation or partial hydrogenation of vegetable oils and animal oils or fats, and metal soaps such as, for example, Ca-stearate.

Suitable polymers and polymer/wax blends are known in particular under the trade names CHT Coat 230, Vapor Coat 2200, Vapor Coat 1300, BimBA 8510, BimBA 8888, Cartaseal VWF, Cartaseal SWF, Sealcoat SL251, Rhobarr 320, B-Coat SP1, B-Coat WB 100, B-Coat 50/3, Chemipearl S300, Ultraseal W-951, Ultraseal W-952, Ukaphob HR 530, Induprint SE 2555, Wukoseal 630, Extomine BG-EM 52%, EurikaCoat 3624, Aquacer 1061 and Epotal SP 106.

The at least one hydrophobic polymer is preferably present in the first barrier layer in an amount of from 1 to 100% by weight, more preferably from 50 to 99.5% by weight or 50 to 100% by weight, based on the total weight of the first barrier layer.

Preferably, the first barrier layer is hydrophobic as a whole.

The first barrier layer may further include additives, such as thickeners, e.g., acrylate-based thickeners, surfactants, e.g., sulfosuccinates, extensional rheology aids, e.g., polyacrylamides, carboxymethylcellulose, polyvinyl alcohols, and/or crosslinking agents, such as aldehydes and polyvalent aldehydes, zirconates, polyvalent epoxies, epichlorohydrin resins, and/or hydrazides.

These additives are preferably each present in an amount of 0.1 to 1% by weight, based on the total weight of the first barrier layer.

The application quantity of the first barrier layer is preferably 1 to 20 g/m$^2$ and particularly preferably 5 to 10 g/m$^2$. The amount refers to the dried first barrier layer in the final product.

The second barrier layer comprises at least one hydrophilic polymer. This barrier layer preferably serves as a barrier layer for oxygen and thus protects the packaged product from oxidation.

The hydrophilic polymer preferably comprises a polymer based on a polyvinyl alcohol. Suitable polymers include, in particular, polymers based on vinyl alcohol or copolymers of ethylene and vinyl alcohols.

Suitable polymers are known in particular under the trade names Exceval AQ 4104, Exceval HR 3010, Sealcoat HS 25 and MichemFlexB 1001.

The at least one hydrophobic polymer is preferably present in the second barrier layer in an amount of from 1 to 100% by weight, more preferably from 50 to 99.5% by weight or 50 to 100% by weight, based on the total weight of the second barrier layer.

Preferably, the second barrier layer is hydrophilic as a whole.

The second barrier layer may further comprise additives, such as thickeners, e.g., acrylate-based thickeners, surfactants, e.g., sulfosuccinates, extensional rheology aids, e.g., acrylate-based extensional rheology aids, and/or crosslinking agents, such as aldehydes and polyvalent aldehydes, zirconates, polyvalent epoxies, epichlorohydrin resins, and/or hydrazides.

These additives are preferably each present in an amount of 0.1 to 1% by weight, based on the total weight of the second barrier layer.

The application quantity of the second barrier layer is preferably 1 to 20 g/m$^2$ and particularly preferably 1 to 10 g/m$^2$. The amount refers to the dried second barrier layer in the final product. The third barrier layer comprises at least one hydrophobic polymer. This barrier layer preferably serves as a barrier layer for water vapor and thus protects the packaged product from drying out.

The at least one hydrophobic polymer included in the third barrier layer is preferably a thermoplastic polymer, such that the layer becomes sealable as a result.

"Sealing" is preferably understood to mean the joining of two layers of coated paper by means of local heat (in "heat sealing") or by means of ultrasound.

The at least one hydrophobic polymer preferably comprises a polymer based on a polyacrylate and/or a polyolefin. Suitable polymers are in particular also polymethyl acrylates, polymethyl methacrylates, polyethyl arylates, polyethyl methacrylates, poly(n-, iso-, tert.-)butyl acrylates, poly (n-, iso-, tert)butyl methacrylates, polycyclohexyl methacrylates, polyethylhexyl acrylates and copolymers thereof, graft polymers, and copolymers with styrene, acrylonitrile, methylstyrene or vinyl toluene, styrene-butadiene copolymers), polyvinyl acetates (also partially saponified), polyesters, polyamides, polyurethanes, polyethers, polyethylene imines, and/or polyvinylamides.

In addition to the hydrophobic polymer, a wax may also be present. Suitable waxes include compounds such as kerosenes or natural mixtures or pure substances of short- to medium-chain hydrocarbon compounds, colloquially known as "waxes." Suitable waxes are, for example, heneicosane, docosane, tricosane, tetracosane, pentacosane, hexacosane, heptacosane, octacosane, nonacosane, triacontane, hentriacontane, dotriacontane, tritriacontane, tetratriacontane, pentatriacontane, hexatriacontane, heptatriaontane, octatriacontane, nonatriacontane; Montan waxes, natural waxes (carnauba wax, beeswax, candelilla wax), waxes produced by hydrogenation or partial hydrogenation of vegetable oils and animal oils or fats, and metal soaps such as, for example, Ca-stearate.

Suitable polymers and polymer/wax blends are known in particular under the trade names Vapor Coat 1300, BimBA 8888, Cartaseal SWF, Sealcoat SL251, Rhobarr 320, B-Coat SP1, B-Coat WB 100, B-Coat 50/3, Chemipearl S300, Ultraseal W-951, Ultraseal W-952, Wukoseal 630, EurikaCoat 3624 and Epotal SP 106.

The at least one hydrophobic polymer is preferably present in the third barrier layer in an amount of from 1 to 100% by weight, more preferably from 50 to 100% by weight or 50 to 99.5% by weight, based on the total weight of the third barrier layer.

Preferably, the third barrier layer is hydrophobic as a whole.

The third barrier layer may further include additives, such as thickeners, e.g., acrylate-based thickeners, surfactants, e.g., sulfosuccinates, extensional rheology aids, e.g., acrylate-based extensional rheology aids, waxes, e.g. Fatty acids or fatty acid amide-based waxes, additives for reducing abrasion sensitivity and increasing slip, such as layer silicates, in particular magnesium silicate hydrates or aluminosilicates and/or crosslinking agents, such as aldehydes and polyvalent aldehydes, zirconates, polyvalent epoxies, epichlorohydrin resins and/or hydrazides.

These additives are preferably each present in an amount of from 0 to 50% by weight, preferably from 0 to 30% by weight, based on the total weight of the third barrier layer.

The application quantity of the third barrier layer is preferably 1 to 20 g/m$^2$ and particularly preferably 5 to 10 g/m$^2$. The amount refers to the dried third barrier layer in the final product.

In a particular embodiment, when the packaged product contains fats as well as water, the third barrier layer should not contain low molecular weight fat-soluble ingredients, except for minute amounts approved for contact with fatty foods. This largely rules out waxes for improving the water vapor barrier, and one must resort to polymer systems that form acceptable water vapor barriers even without waxes and are ideally heat sealable. Copolymers of nonpolar monomers such as ethylene with acrylic acid and other ethylenically unsaturated carboxylic acids, which in addition to the water vapor barrier also possess a certain fatty barrier, are suitable for this purpose. Well-known products include Cartaseal SWF, Wukoseal 630 and Sealcoat SL 251. The first barrier layer may nevertheless contain waxes, since the second barrier layer, with its function as an oxygen, grease and mineral oil barrier, also forms an excellent barrier against waxes, which usually have a strongly non-polar character.

In a preferred embodiment of the coated paper according to the invention, a precoat comprising at least one inorganic pigment and a polymeric binder is present between the base paper and the first barrier layer.

The inorganic pigment comprises in particular a silicate, preferably a layered silicate and very preferably a kaolin.

The polymeric binder preferably comprises a polymeric binder based on a polyacrylate.

Suitable polymer binders include, in particular, acrylate-based or styrene/butadiene-based binders. In principle, all polymers that can be used as binders for pigment coatings in the paper industry are suitable. Starch-based binders are also possible.

Suitable polymer binders are known in particular under the trade names Acronal 305S, Ligos K 4079, Acronal S 728, XZ94346.01, XZ94346.00.

The precoat preferably contains 1 to 70% by weight, preferably 5 to 50% by weight, of polymeric binder. The quantity refers to the dried precoat in the final product.

The precoat further preferably contains 50 to 95% by weight, preferably 80 to 90% by weight, of inorganic pigment. The quantity refers to the dried precoat in the final product.

In addition, the precoat may contain additives such as thickeners, e.g., acrylate-based thickeners, surfactants and/or rheology modifiers. The use of crosslinkers is also conceivable. Preferably, the precoat contains a zirconium-based crosslinker and is itself crosslinked with formaldehyde.

These additives are preferably each present in an amount of 0 to 2% by weight. The quantity refers to the dried precoat in the final product.

The application rate of the precoat is preferably 1 to 10 $g/m^2$ and particularly preferably 2 to 6 $g/m^2$.

The quantity refers to the dried precoat in the final product.

If such a precoat (also called primer) is applied, this has the advantage that the paper surface is sealed and the further barrier layers coated on it do not migrate into the paper. Furthermore, this precoat reduces the average roughness depth of the base paper and offers an advantageous holdout, which is characterized by an area covering application and a defined surface energy, so that a coated barrier layer can be optimally formed. In addition, the precoat imparts ply adhesion between the base paper and the barrier layers, which may be important for subsequent sealing applications.

In another preferred embodiment, the coated paper is characterized in that a sealant layer comprising at least one thermoplastic polymer is present on the third barrier layer.

Such a sealant layer is particularly useful when the at least one hydrophobic polymer in the third barrier layer does not comprise a thermoplastic polymer, i.e., is not heat sealable.

The sealant layer preferably comprises a thermoplastic polymer based on a polyacrylate, a styrene/butadiene copolymer and/or a polyolefin.

Suitable polymers include in particular acrylates, polymethacrylates, polymethylacrylates, polymethylmethacrylates, polyethylarylates, polyethylmethacrylates, poly(n-, iso-, tert.-)butyl acrylates, poly(n-, iso-, tert)butyl methacrylates, polycyclohexyl methacrylates, polyethylhexyl acrylates and copolymers thereof, graft polymers, and copolymers with styrene, acrylonitrile, methylstyrene and/or vinyl toluene.

Suitable polymers are particularly known under the trade names Vapor Coat 1300, BimBA 8888, Cartaseal SWF, Rhobarr 320, B-Coat WB 100, B-Coat 50/3, Chemipearl S300, Ultraseal W-952, Wukoseal 630, EurikaCoat 3624, Epotal SP 106, Hypod 2000, Extomine BS-OF 40%, Aquaseal X2200, Cartaseal SCR, CHT Coat 8080, Sealcoat MB46HE and Extomine BG-EM 48%.

The at least one thermoplastic polymer in the sealant layer is preferably present in an amount of from 1 to 100% by weight, more preferably from 70 to 100% by weight or from 70 to 99.5% by weight, based on the total weight of the sealant layer.

The sealant layer may further contain additives, such as thickeners, e.g., acrylate-based thickeners, surfactants, e.g., sulfosuccinates, extensional rheology aids, e.g., acrylate-based extensional rheology aids, waxes, additives to reduce abrasion sensitivity and increase slip, such as layer silicates, in particular magnesium silicate hydrates or aluminosilicates, and/or crosslinking agents.

These additives are preferably each present in an amount of from 0 to 50% by weight, preferably from 0 to 30% by weight, based on the total weight of the sealant layer.

The application quantity of the sealant layer is preferably 1 to 10 $g/m^2$ and particularly preferably 1 to 5 $g/m^2$. The quantity refers to the dried sealant layer in the final product.

BRIEF DESCRIPTION OF THE DRAWINGS

In the following, embodiments of the invention are explained in more detail with reference to drawings. In the drawings.

FIG. 3 shows a third embodiment of a packaging according to the invention; and

DETAILED DESCRIPTION

Figure 1:
FIG. 1 shows a section of the coated paper used in the invention.

FIG. 1 shows a cross-section of a section of a coated paper 1 used in the invention. The paper 1 comprises a base paper 2, for example paper material with a basis weight of 20-120 $g/m^2$, or stronger paper material such as cardboard or paperboard. At least three different coatings are provided on top of each other on the base paper, namely—in the sequence in which they are given, starting from the base paper 2—a first barrier layer 3, a second barrier layer 4 and a third barrier layer 5. Here, the first barrier layer 3 comprises at least one hydrophobic polymer, while the second barrier layer 4 has at least one hydrophilic polymer and the third barrier layer 5 again comprises at least one hydrophobic polymer. As an option, FIG. 1 indicates that a sealant layer 6 can additionally be provided on the third barrier layer 5, which can be melted under the influence of pressure and/or heat and, in particular, can comprise at least one thermoplastic polymer. Also optionally present between the base paper 2 and the first barrier layer 3 is a precoat 7, which may comprise an inorganic pigment and a polymeric binder.

Figure 2:
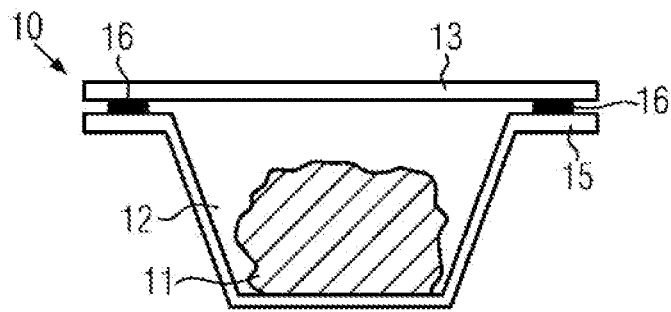
FIG. 2 shows a first embodiment of a packaging according to the invention.

FIG. 2 shows a first embodiment of a packaging 10 according to the invention in horizontal section. A product 11, such as a perishable food product, is received in an interior 12 of the packaging 10.

The packaging 10 has a first piece of packaging material 13, which in this embodiment forms the lid of the packaging 10. The first piece of packaging material 13 comprises or consists of a coated paper 1 correspondingly to FIG. 1. The side of the coated paper 1 on which the base paper 2 lies faces away from the interior 12 of the packaging 10.

The packaging 10 further comprises a second piece of packaging material 14. The second piece of packaging material 14 may be a thermoformed tray made of a plastic material.

The first and second pieces of packaging material 13, 14 are connected to each other by a seal seam 16 extending along an edge 15 of the packaging 10. The seal seam 16 is circumferential and gas-tight, so that the packaging 10 is also gas-tight (i.e., hermetically sealed) overall.

The interior 12 of the packaging 10 may be either evacuated or gassed with an exchange gas (or mixture of exchange gases) such that an oxygen content of an atmosphere in the interior 12 is either less than 3% or greater than 60%.

Figure 3:
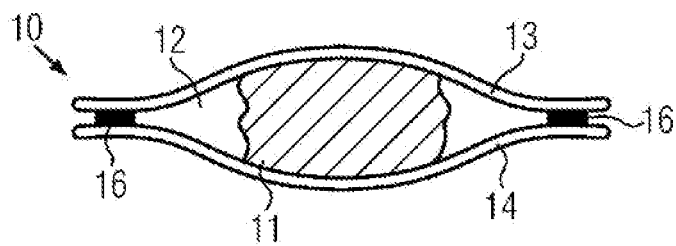
FIG. 3 shows a second embodiment of a packaging according to the invention.

FIG. 3 shows a second embodiment of a packaging 10 according to the invention. This packaging 10 again has a first piece of packaging material 13 and a second piece of packaging material 14, which are sealed to each other by means of a seal seam 16. The packaging 10 is thus sealed in a gas-tight manner. At least one of the two pieces of packaging material 13, 14 is a coated paper 1. Again, as in the embodiment example according to FIG. 2, an oxygen content in the interior 12 of the packaging 10 can be either less than 3% or more than 60%.

Figure 4:
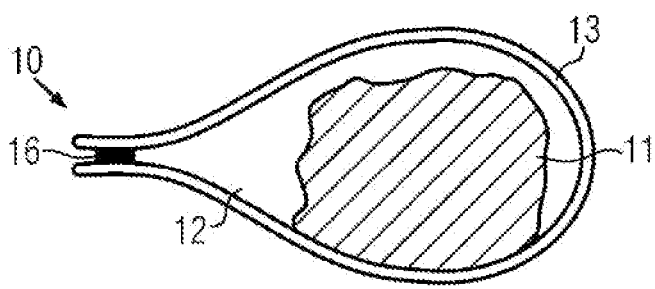

FIG. 4 shows a third embodiment of a packaging 10 according to the invention—here in the form of a pouch, such as can be produced on a chamber type vacuum packaging machine or a chamber belt machine. The packaging 10 according to FIG. 4 is produced from a single piece of packaging material 13 folded back on itself so that the third barrier layer 5 or the sealant layer 6 is on the inside. By means of a seal seam 16 at the neck of the bag, the packaging 10 is sealed in a gas-tight manner. Again, the oxygen content in the interior 12 of the packaging 10 can be either less than 3% or greater than 60%.

Figure 5:
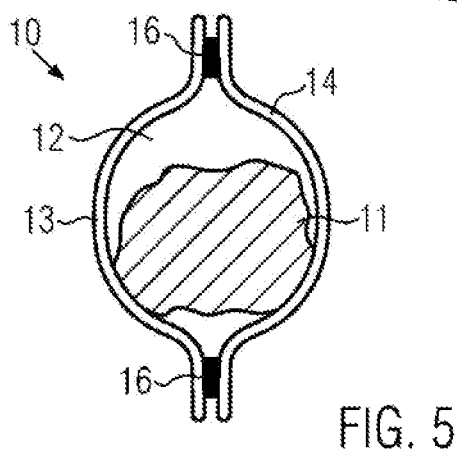
FIG. 5 shows a fourth embodiment of a packaging according to the invention.

Finally, FIG. 5 shows a fourth embodiment of a packaging according to the invention. This form of packaging 10 can, for example, be produced on a tubular bag packaging machine. The packaging 10 according to FIG. 5 has either a first and a second piece of packaging material 13, 14, each of which is a coated paper 1 according to FIG. 1. Alternatively, the packaging 10 according to FIG. 5 comprises only a single, first piece of packaging material 13 folded back on itself. Seal seams 16 provide a gas-tight seal for the packaging 10.

In particular, the coated paper used in the packaging could have the following characteristics (individually or cumulatively):

the first barrier layer contains or consists of substances selected from the group consisting of lipophilic substances, kerosenes, in particular hard kerosenes, waxes, in particular microcrystalline waxes, waxes based on vegetable oils or fats, waxes based on animal oils or fats, vegetable waxes, animal waxes, low molecular weight polyolefins, polyterpenes and mixtures thereof.

the second barrier layer reduces or prevents the transfer of substances, in particular hydrophobic substances.

the transfer of substances, in particular hydrophobic substances, from or through the first barrier layer, into or beyond the third barrier layer is reduced or prevented.

the transfer of substances, in particular hydrophobic substances, from the third barrier layer or through the third barrier layer, into the first barrier layer is prevented.

the transfer of substances selected from the group consisting of lipophilic substances, kerosenes, in particular hard kerosenes, waxes, in particular microcrystalline waxes, waxes based on vegetable oils or fats, waxes based on animal oils or fats, vegetable waxes, animal waxes, low molecular weight polyolefins, polyterpenes and mixtures thereof is reduced or prevented.

the third barrier layer is free, apart from unavoidable or permissible impurities, from substances which are not permitted for direct food contact, in particular from substances selected from the group consisting of lipophilic substances, kerosenes, in particular hard kerosenes, waxes, in particular microcrystalline waxes, waxes based on vegetable oils or fats, waxes based on animal oils or fats, vegetable waxes, animal waxes, low molecular weight polyolefins, polyterpenes and mixtures thereof.

The packaging can preferably be used for packaging food fats or foods containing oil and/or fat.

What is claimed:

1. A packaging comprising at least one first piece of packaging material, wherein the first piece of packaging material comprises a coated paper, which has a base paper and at least three coatings applied one on top of the other on the base paper, wherein the at least three coatings have comprise in a sequence in which they are given, starting from the base paper, a first barrier layer, comprising at least one hydrophobic polymer, a second barrier layer, comprising at least one hydrophilic polymer, and a third barrier layer, comprising at least one hydrophobic polymer, wherein the packaging is closed in a gas-tight manner, and wherein a precoat comprising at least one inorganic pigment and a polymeric binder is present between the base paper and the first barrier layer.

2. The packaging according to claim 1, wherein an oxygen content in an interior space atmosphere of the packaging is either below 3% or above 60%.

3. The packaging according to claim 1, wherein an oxygen content in an interior space atmosphere of the packaging is either below 2% or above 70%.

4. The packaging according to claim 1, wherein the packaging is closed in a gas-tight manner by at least one seal seam.

5. The packaging according to claim 4, wherein the packaging comprises only the first piece of packaging material and this is sealed to itself.

6. The packaging according to claim 4, wherein the packaging is produced on a tubular bag packaging machine or a chamber type vacuum packaging machine.

7. The packaging according to claim 4, wherein the packaging comprises a second piece of packaging material, and the first and second pieces of packaging material are sealed to each other.

8. The packaging according to claim 7, wherein the second piece of packaging material comprises a plastic material.

9. The packaging according to claim 7, wherein the second piece of packaging material comprises a coated paper, which has a base paper and at least three coatings applied one on top of the other on the base paper, wherein the at least three coatings have in a sequence in which they are given, starting from the base paper, a first barrier layer, comprising at least one hydrophobic polymer, a second barrier layer, comprising at least one hydrophilic polymer, and a third barrier layer, comprising at least one hydrophobic polymer.

10. The packaging according to claim 4, wherein the packaging is produced on a tray sealing machine or a thermoforming packaging machine.

11. The packaging according to claim 1, wherein a sealant layer is present on the third barrier layer.

12. The packaging according to claim 1, wherein the base paper has a basis weight of from 20 to 120 g/m$^2$.

13. The packaging according to claim 1, wherein the first barrier layer comprises at least one hydrophobic polymer based on a polyacrylate and/or a polyolefin.

14. The packaging according to claim 1, wherein the second barrier layer comprises at least one hydrophilic polymer based on a polyvinyl alcohol.

15. The packaging according to claim 1, wherein the third barrier layer comprises at least one hydrophobic polymer based on a polyacrylate, a styrene butadiene copolymer and/or a polyolefin.

16. The packaging according to claim 1, wherein the inorganic pigment comprises a silicate.

17. The packaging according to claim 8, wherein the plastic material comprises a thermoformable plastic material.

18. The packaging according to claim 11, wherein the sealant layer comprises at least one thermoplastic polymer.

19. A packaging comprising at least a first piece of packaging material, wherein the first piece of packaging material comprises a coated paper, which has a base paper and at least three coatings applied one on top of the other on the base paper, wherein the at least three coatings comprise in a sequence in which they are given, starting from the base paper, a first barrier layer, comprising at least one hydrophobic polymer, a second barrier layer, comprising at least one hydrophilic polymer, and a third barrier layer, comprising at least one hydrophobic polymer, wherein the packaging is closed in a gas-tight manner, wherein the packaging comprises a second piece of packaging material, and the first and second pieces of packaging material are sealed to each other, wherein the second piece of packaging material comprises a thermoformable plastic material.

20. A packaging comprising a first piece of packaging material, wherein the first piece of packaging material comprises a coated paper, which has a base paper and at least three coatings applied one on top of the other on the base paper, wherein the at least three coatings comprise in a sequence in which they are given, starting from the base paper, a first barrier layer, comprising at least one hydrophobic polymer, a second barrier layer, comprising at least one hydrophilic polymer, and a third barrier layer, comprising at least one hydrophobic polymer, wherein the packaging is closed in a gas-tight manner, wherein the packaging comprises only the first piece of packaging material and this is sealed to itself.

* * * * *